June 3, 1941. H. C. GEHLKE 2,243,951
METHOD OF DIVIDING A CHICKEN
Filed March 7, 1939
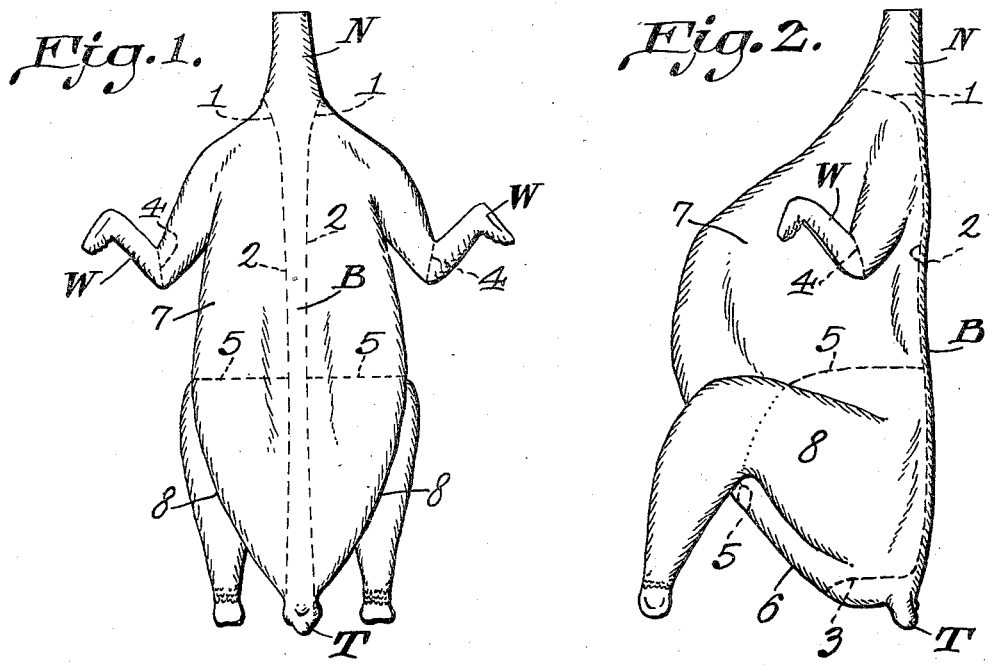
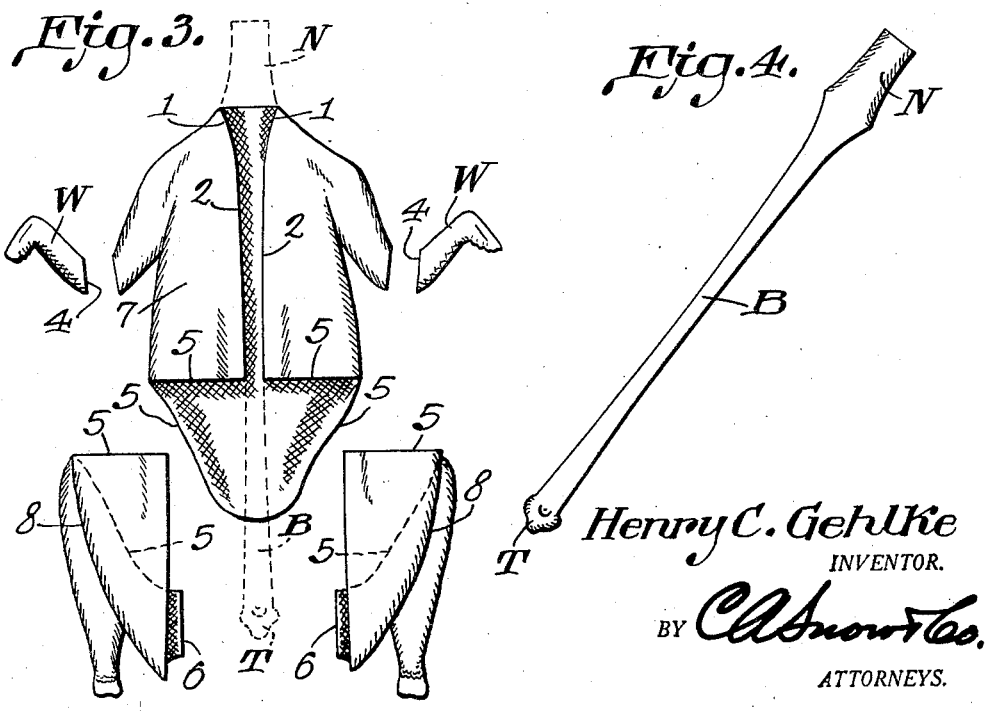
Henry C. Gehlke
INVENTOR.
BY C. A. Snow & Co.
ATTORNEYS.

Patented June 3, 1941

2,243,951

UNITED STATES PATENT OFFICE 2,243,951

METHOD OF DIVIDING A CHICKEN

Henry Charles Gehlke, Cleveland, Ohio

Application March 7, 1939, Serial No. 260,394

4 Claims. (Cl. 17—45)

This invention relates to a new and improved method of dividing a dressed chicken so that the dark meat will be separated from the white meat, fewer pieces will be required than usual, and the number of pieces of low value will be reduced to the minimum.

Heretofore, when cutting a chicken for the purpose of selling the parts separately, it has been the general practice to sever the several parts at the joints into not less than eight parts. As a result the chicken has produced three choice pieces having 55% to 60% of the weight of the carcass and five less desirable pieces having 45% to 40% of the weight. An object of the present invention is to reduce the number of pieces to six, three of which are choice and contain 90% of the weight of the carcass while only three less choice pieces are formed, these totaling but 10% of the weight.

When a carcass is divided into eight or more pieces as heretofore, it has not been possible to get a true picture of the carcass as a whole, and the parts therefore do not have as great a sales value as larger pieces resulting from fewer cuts in which the qualities of the carcass are more noticeable. Therefore an object of the present invention is not only to produce larger and more attractive choice cuts, the handling, packing and marketing of which are simplified, but also to reduce the number of the smaller or soup stock pieces so as to correspondingly increase the value of the carcass.

Another object is to make the pieces of such size, character and design that they can readily be processed and merchandised as quick frozen food.

With the foregoing and other objects in view which will appear as the description proceeds, the invention consists of certain novel details of construction and combinations of parts and in certain steps of the method hereinafter more fully described and pointed out in the claims, it being understood that changes may be made in the construction and arrangement of parts and in the disclosed method without departing from the spirit of the invention as claimed.

In the accompanying drawing the preferrred form of the invention has been shown.

In said drawing—

Figure 1 is a back view of a dressed chicken showing by broken lines, where cuts are to be made.

Figure 2 is a side view.

Figure 3 is a rear view showing the parts separated, the back piece being indicated by broken lines.

Figure 4 is a perspective view of the removed back piece.

In carrying out the method a cut is made around the base of the neck N at the front and sides as shown at 1 and the cut is then continued lengthwise of the back B at opposite sides of the backbone as shown at 2 and thence forwardly at the sides and in front of the tail as at 3. As the cut is made through the ribs the resultant back piece shown in Figure 4 will consist of the neck N, backbone B and tail T. This is of no value except for soup stock.

Each wing end W is to be severed at the second joint a indicated at 4.

The final cuts are along the lines 5 through the skin covering the natural divisions between the breast and thighs. Each thigh is then pulled from the breast and the carcass is cut across the joint in the last two or three ribs to the back. Thereafter the parts are separated at the front as shown at 6.

As a result of the foregoing method the carcass is divided into three choice parts totaling 90% of the weight, and three soup stock pieces totaling but 10% of the weight.

The portion 7 consists of the breast, ribs and first joint of each wing and contains substantially 99% of all white meat.

Each of the two portions 8 consists of leg, thigh and rump and the two portions contain all of the dark meat except what is on the neck.

From the foregoing it will be noted that the three choice pieces, one white and two dark, will contain substantially 90% of the meat, and, as most of the carcass is contained in these choice pieces, a better price can be obtained than where there is an intermediate grade and a low grade of pieces, as ordinarily.

While this method is especially designed for cutting chickens, it can also be followed in dividing the carcasses of other fowls.

Should it be desired to provide a flat and nearly boneless white portion, the added step of removing the breast bone from within the carcass after the cutting operations, could be employed.

What is claimed is:

1. The method of dividing the white meat from the dark meat of a chicken which includes cutting from the carcass a back strip comprising the neck, backbone and tail, separating the thighs from the breast from front to back and from each other at the front, and dividing the wings at the second joints, thereby to produce three choice pieces, and three less choice pieces.

2. The method of dividing the white meat from the dark meat of a chicken which includes cutting from the carcass a back strip comprising the neck, backbone and tail, separating the thighs from the breast from front to back and from each other at the front, and dividing the wings at the second joints, thereby to produce three choice pieces containing approximately 90% of the meat, and three less choice pieces containing approximately 10% of the meat.

3. The method of separating the white meat from the dark meat of a chicken which includes as a step the removal of the neck, backbone and tail as a single piece and the added step of separating the thighs from each other and from the breast, each thigh including a leg and a portion of the rump as an integral part thereof.

4. The method of dividing a chicken which includes cutting from the carcass a back strip comprising the neck, back bone and tail, separating the thighs from the breast from front to back and from each other at the front, dividing the wings at the second joint, thereby producing a choice white piece, two choice dark pieces, and three less choice pieces, and finally removing the breast bone from the choice white piece.

HENRY CHARLES GEHLKE.